(12) United States Patent
Moon et al.

(10) Patent No.: US 10,186,948 B2
(45) Date of Patent: Jan. 22, 2019

(54) BURST MODE CONTROL IN RESONANT CONVERTERS

(71) Applicant: FAIRCHILD KOREA SEMICONDUCTOR LTD., Buehcon (KR)

(72) Inventors: Sangcheol Moon, Bucheon (KR); Jintae Kim, Sungnam-si (KR); Hangseok Choi, Suwon (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/668,983

(22) Filed: Aug. 4, 2017

(65) Prior Publication Data

US 2018/0054134 A1 Feb. 22, 2018

Related U.S. Application Data

(60) Provisional application No. 62/377,063, filed on Aug. 19, 2016.

(51) Int. Cl.
| | | |
|---|---|---|
| H02M 3/335 | (2006.01) | |
| H02M 1/08 | (2006.01) | |
| H02M 1/36 | (2007.01) | |
| H02H 1/00 | (2006.01) | |
| H02M 1/32 | (2007.01) | |

(Continued)

(52) U.S. Cl.
CPC .......... *H02M 1/083* (2013.01); *H02H 1/0007* (2013.01); *H02M 1/08* (2013.01); *H02M 1/32* (2013.01); *H02M 1/36* (2013.01); *H02M 3/3376* (2013.01); *H02M 3/33523* (2013.01); *H02M 3/33546* (2013.01); *H02M 2001/0009* (2013.01);

(Continued)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 2007/4818; H02M 2007/4815; Y02B 70/1425; Y02B 70/1491
See application file for complete search history.

(56) References Cited

U.S. PATENT DOCUMENTS 5,973,943 A 10/1999 Ribarich et al.
6,256,210 B1 7/2001 Strijker et al.
(Continued)

OTHER PUBLICATIONS

Keeping, Steven, Digi-Key Electronics, "A Review of Zero-Voltage Switching and Its Importance to Voltage Regulation," May 7, 2017.
(Continued)

*Primary Examiner* — Timothy J Dole
*Assistant Examiner* — Bryan R Perez
(74) *Attorney, Agent, or Firm* — Brake Hughes Bellermann LLP

(57) ABSTRACT

According to an implementation, a resonant converter for burst mode control includes an oscillator configured to control switching operations of at least one power switch, and a burst mode controller configured to control a burst mode by determining a start of a burst pulse of the burst mode using a first internal signal and determining an end of the burst pulse of the burst mode using a second internal signal. The burst mode controller is configured to stop the switching operations during the burst pulse.

20 Claims, 7 Drawing Sheets

(51) Int. Cl.
*H02M 3/337* (2006.01)
*H02M 1/00* (2006.01)

(52) U.S. Cl.
CPC ............... *H02M 2001/0035* (2013.01); *H02M 2001/0054* (2013.01)

(56) References Cited

U.S. PATENT DOCUMENTS

| | | | |
|---|---|---|---|
| 6,331,755 | B1 | 12/2001 | Ribarich et al. |
| 6,496,387 | B2 | 12/2002 | Halberstadt |
| 6,879,115 | B2 | 4/2005 | Ribarich |
| 7,116,561 | B2 | 10/2006 | Osaka |
| 7,323,825 | B2 | 1/2008 | Hwang et al. |
| 7,750,615 | B2 | 7/2010 | Jung et al. |
| 8,014,176 | B2 | 9/2011 | Melanson et al. |
| 8,737,101 | B2 | 5/2014 | Cho et al. |
| 9,203,318 | B2 | 12/2015 | Scibilia |
| 2009/0244934 | A1* | 10/2009 | Wang ................ H02M 3/33592 363/21.06 |
| 2010/0202170 | A1* | 8/2010 | Kim .................. H02M 3/33507 363/74 |
| 2012/0307530 | A1* | 12/2012 | Miyazaki ................ H02M 1/36 363/21.01 |
| 2015/0003117 | A1* | 1/2015 | Ferrazza ........... H02M 3/33546 363/21.02 |
| 2015/0229220 | A1 | 8/2015 | Lee et al. |
| 2018/0054134 | A1 | 2/2018 | Moon et al. |

OTHER PUBLICATIONS

Abdel-Rahman, Sam, Infineon Technologies North America (IFNA) Corp., "Resonant LLC Converter: Operation and Design," V1.0 Sep. 2012.
STMicroelectronics, "AN2644 Application Note, An Introduction to LLC Resonant Half-Bridge Converter," Sep. 2008.
STMicroelectronics, "L6699 Enhanced High Voltage Resonant Controller," Jan. 2013.
Fairchild Semiconductor, now part of ON Semiconductor, "FAN7631 Advanced Pulse Frequency Modulation (PFM) Controller for Half-Bridge Resonant Converters," Apr. 2012.
STMicroelectronics, "L6699 Enhanced High-Voltage Resonant Controller," 2017.
ON Semiconductor, "NCP1399: Current Mode Resonant Controller with Integrated High Voltate Drivers, High Performance," My 21, 2017.
ON Semiconductor, "NPC1399 Series High Performance Current Mode Resonant Controller with Integrated High-Voltage Drivers," Jan. 2017.
Fairchild Semiconductor, now part of ON Semiconductor, "AN-6104 LLC Resonant Converter Design Using FAN7688," Sep. 16, 2015.
STMicroelectronics, "STCMB1 TM PFC with X-Cap Discharge and LLC Resonant Combo Controller," 2017.
Shenzhen Ming Feng Wei Electronics Co., Ltd., "Supply TEA1916T NXP NXP Synchronous Rectifier Controller," May 7, 2017.

* cited by examiner

BURST MODE CONTROL IN RESONANT CONVERTERS

RELATED APPLICATIONS

This application claims priority to and the benefit of, under 35 U.S.C. § 119, U.S. Provisional Patent Application No. 62/377,063, filed Aug. 19, 2016, which is hereby incorporated by reference in its entirety.

This application is related to U.S. patent application Ser. No. 15/668,974, filed on Aug. 4, 2017, U.S. patent application Ser. No. 15/668,975, filed on Aug. 4, 2017, and U.S. patent application Ser. No. 15,668,980, filed on Aug. 4, 2017, each of which is incorporated by reference in its entirety.

TECHNICAL FIELD

This description relates to improving operations of resonant converters.

BACKGROUND

A resonant converter may convert an input voltage to an output voltage. When the output of a resonant converter becomes relatively low, the resonant converter may operate in burst mode to reduce power consumption. In some conventional approaches, burst mode is determined by a dedicated pin representing an output load condition.

SUMMARY

According to an implementation, a resonant converter for burst mode control includes an oscillator configured to control switching operations of at least one power switch, and a burst mode controller configured to control a burst mode by determining a start of a burst pulse of the burst mode using a first internal signal and determining an end of the burst pulse of the burst mode using a second internal signal. The burst mode controller is configured to stop the switching operations during the burst pulse.

The details of one or more implementations are set forth in the accompanying drawings and the description below. Other features will be apparent from the description and drawings, and from the claims.

DETAILED DESCRIPTION

Figure 1A:
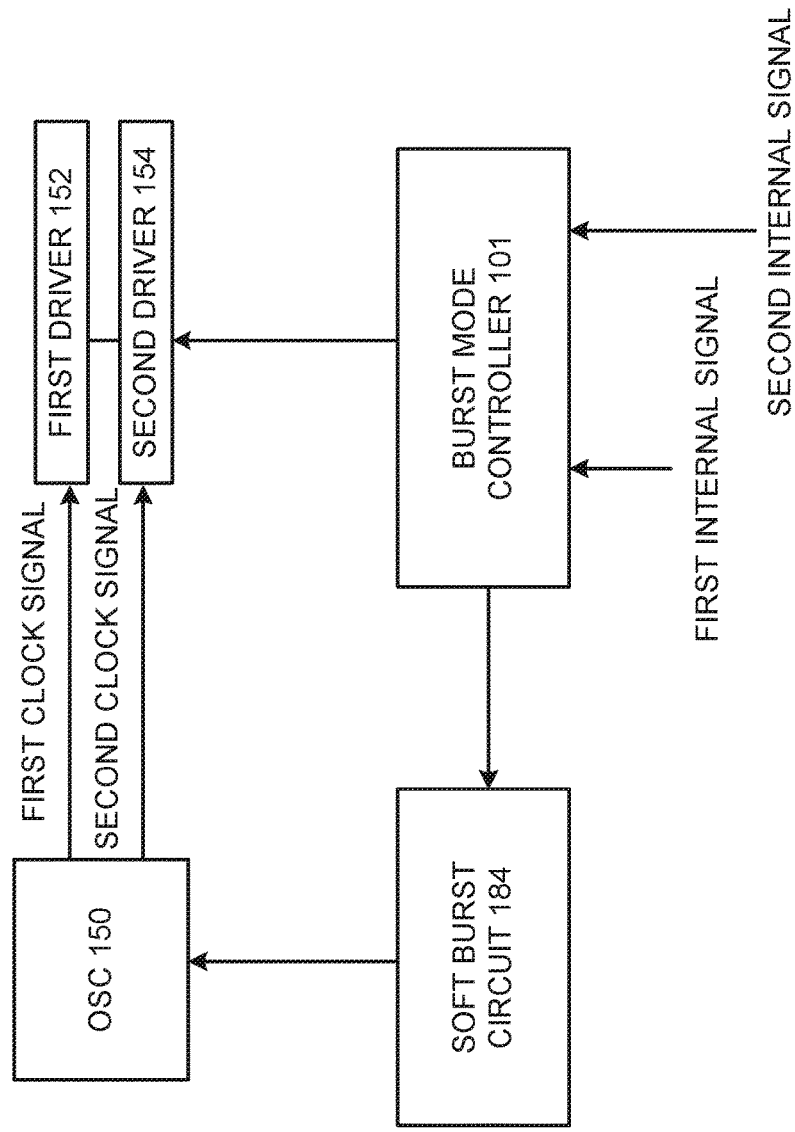
FIG. 1A illustrates a resonant converter for burst mode control according to an implementation.

FIG. 1A illustrates a resonant converter 100 for burst mode control according to an implementation. For example, instead of using a dedicated pin to determine the output load condition of the resonant converter 100, the resonant converter 100 controls the burst mode using internal signals. The resonant converter 100 may use the internal signals to determine when the switching operations are stopped (e.g., held, paused, temporarily terminated) and resumed (e.g., restarted) under the burst mode control. As a result, a pin may be saved since a dedicated pin to determine the output load condition may not be needed. Rather, at least one of the internal signals may represent the output load condition. In addition, the resonant converter 100 may use a soft burst to resume switching operations in a manner that gradually increases the primary side current, which can reduce audible noise.

The resonant converter 100 may include an oscillator 150 configured to control switching operations of a first power switch and a second power switch. For example, the oscillator 150 may generate a first clock signal for driving the first power switch via a first driver 152, and generate a second clock signal for driving the second power switch via second driver 154.

As output current demand falls, the resonant converter 100 may increase the switching frequency of the first and second power switches to reduce the power output. However, when low or zero-load conditions are encountered, the required switching frequency may become impractical and can cause a drop in efficiency due to increases in switching losses in conjunction with the relative drop in output power vs. power consumed in normal switching operations. However, the resonant converter 100 may operate within a burst control mode to reduce the power consumption when the output is relatively low. The burst control mode is a driving mode for the resonant converter 100 to output power through switching for a first time duration, stop the switching for a second time duration, and repeat the process a number of times so as to reduce power consumption when an output load becomes relatively low (e.g., below a threshold level).

The resonant converter 100 includes a burst mode controller 101 that controls a burst mode by determining a start of a burst pulse using a first internal signal and determining an end of the burst pulse using a second internal signal, where the burst mode controller 101 stops the switching operations during the burst pulse (e.g., the burst pulse duration being from the start of the burst pulse to the end of the burst pulse). For example, the burst mode control may have a plurality of burst pulses including a first burst pulse and a second burst pulse. The first burst pulse may have a first duration, and the second burst pulse may have a second duration. At the start of the first burst pulse, the burst mode controller 101 may stop the switching operations, and continue to stop the switching operations during the first duration until the end of the first burst pulse. At the end of the first burst pulse, the switching operations may be resumed by a soft burst (as further described below). The switching operations continue until the start of the second burst pulse. At the start of the second burst pulse, the burst mode controller 101 may stop the switching operations, and continue to stop the switching operations during the second duration until the end of the second burst pulse. The burst mode controller 101 determines when to start each burst pulse according to a first internal signal, and determines when to end each burst pulse according to a second internal signal.

The first internal signal may represent an output load condition of the resonant converter 100. In some examples, the first internal signal includes a power estimation signal. In some examples, the second internal signal includes a frequency control signal. In some examples, the burst mode controller 101 may determine the start of the burst pulse in response to a voltage of the first internal signal being less than a first voltage threshold. At the start of the burst pulse, the burst mode controller 101 may control the first driver 152 and the second driver 154 to stop the switching operations of the first power switch and the second power switch. In some examples, the burst mode controller 101 may determine the end of the burst pulse in response to a voltage of the second internal signal being less than a second voltage threshold. At the end of the burst pulse, the burst mode controller 101 may resume the switching operations using a soft burst, as described below.

The resonant converter 100 may include a soft burst circuit 184 that controls the oscillator 150 in a soft burst mode in response to the end of the burst pulse. For example, at the end of the burst pulse, the burst mode controller may trigger the soft burst circuit 184 to operate the oscillator 150 in the soft burst mode. In response to the end of the burst pulse, the soft burst circuit 184 generates and sends a soft burst control signal to the oscillator 150 to resume the switching operations of the first and second power switches. In some examples, the soft burst circuit 184 gradually decreases the switching frequency (in a step-by-step manner) during the soft burst mode. In this manner, the primary side current gradually increases, which can reduce audible noise.

The soft burst control signal may include a multi-step (analog) voltage signal. In some examples, the soft burst control signal includes a first voltage step and a second voltage step, where the voltage of the second voltage step is less than the voltage of the first voltage step. In some examples, the soft burst control signal may include a third voltage step having a voltage less than the second voltage step. In some examples, the soft burst control signal may include more than three voltage steps. The oscillator 150, when in the soft burst mode, switches the first power switch and the second power switch at a first frequency in response to the first voltage step (for a first period of time), decreases the first frequency to a second frequency (at the end of the first voltage step), and switches the first power switch and the second power switch at the second frequency in response to the second voltage step (for a second period of time).

Figure 1B:
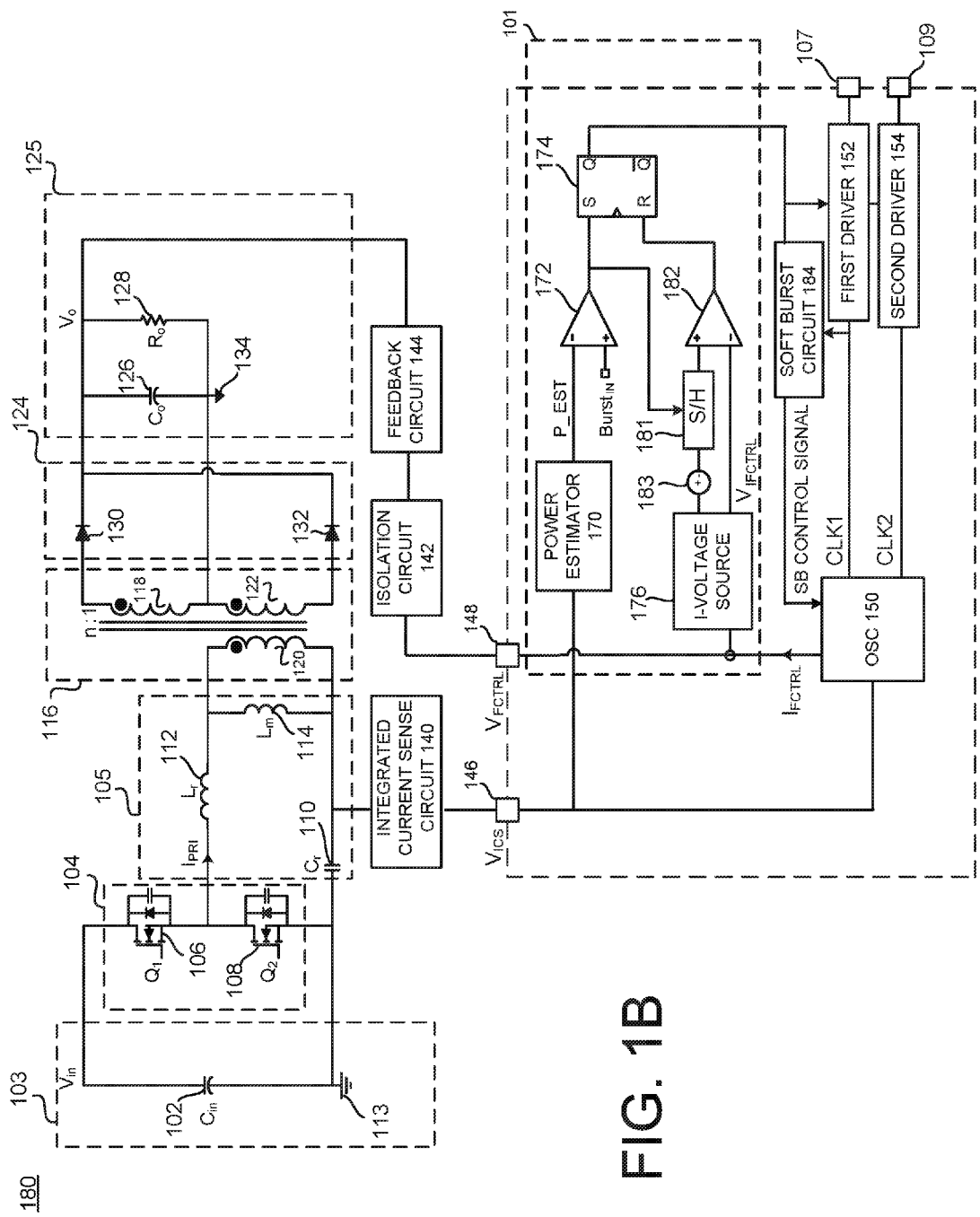
FIG. 1B illustrates a resonant converter for burst mode control according to another implementation.

FIG. 1B illustrates a resonant converter 180 for burst mode control according to another implementation. In some examples, the resonant converter 180 may be an electric power converter that includes a network of one or more inductors and one or more capacitors, which are tuned to resonate at one or more frequencies, and convert an input voltage ($V_{in}$) to an output voltage ($V_o$) based on resonant current oscillation. In some examples, the resonant converter 180 may be a direct current (DC) to DC converter. In some examples, the resonant converter 180 may be a Zero Voltage Switching (ZVS) resonant converter, which turns on at zero voltage, and the output voltage can be controlled by varying the frequency of the switching. In some examples, the resonant converter 180 can be used in a variety of different applications such as Advanced Technology eXtended (ATX) power, server power, audio systems, lighting, game console, computing devices, low to high power applications, and/or soft switching to high frequency switching.

In some examples, the resonant converter 180 is incorporated into an integrated circuit (IC) having a plurality of pins (e.g., a 16 pin or 20 pin arrangement). As shown in FIG. 1B, the pins may include an integrated current sense access pin 146 for access to the integrated current sense signal, a frequency-controlled voltage signal access pin 148 for access to the frequency-controlled voltage signal (VFCTRL), a first gate access pin 107 for access to the gate of a first power switch 106, a second gate access pin 109 for access to the gate of a second power switch 108. In some examples, the IC having the resonant converter 180 may include other pins such as a ground pin, a power supply pin, line voltage sensing, voltage switching node pin, etc. In some examples, the resonant converter 180 may have other components and circuits such as non-zero-voltage switching (ZVS) detection as disclosed in U.S. patent application Ser. No. 15/668,974, filed on Aug. 4, 2017, a resonant capacitor stabilizer as disclosed in U.S. patent application Ser. No. 15/668 975, filed on Aug. 4, 2017, and/or short-circuit protection using pulse width modulation (PWM) as disclosed in U.S. patent application Ser. No. 15,668,980, filed on Aug. 4, 2017, each of which is incorporated by reference in its entirety.

The resonant converter 180 may include an input capacitance circuit 103, a bridge circuit 104, a resonant network 105, a transformer 116, a rectification circuit 124, and an output capacitance circuit 125. Also, the resonant converter 180 may include a feedback circuit 144, an isolation circuit 142, the first driver 152, the second driver 154, and the oscillator 150 (controlled by a frequency-controlled signal ($V_{FCTRL}$)).

The input capacitance circuit 103 may receive an input voltage ($V_{in}$). The input capacitance circuit 103 may include an input capacitor ($C_{in}$) 102 and a ground 113. In some examples, the input capacitor 102 is a polarized capacitor having a negative terminal and a positive terminal. The negative terminal of the input capacitor 102 may be connected to the ground 113. In some examples, the input capacitance circuit 103 may be a circuit separate from the bridge circuit 104. In some examples, the input capacitance circuit 103 may be part of the bridge circuit 104.

Figure 2:
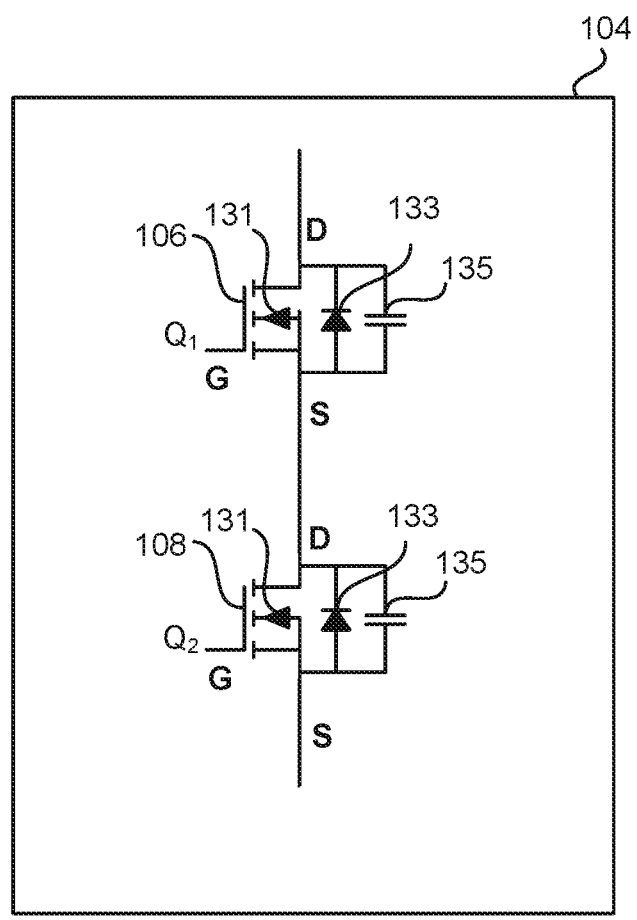
FIG. 2 illustrates an example of a bridge circuit of the resonant converter according to an implementation.

As shown in FIG. 1B, the bridge circuit 104 may be a half-bridge circuit. For example, the bridge circuit 104 may include a pair of power switches including a first power switch 106 and a second power switch 108. In some examples, the first power switch 106 and the second power switch 108 are Metal Oxide Semiconductor Field Effect Transistors (MOSFET) power switches. In some examples, the bridge circuit 104 is a full-bridge circuit having two or more pairs of MOSFET switches. FIG. 2 illustrates an example of the bridge circuit 104 having the first power switch 106 and the second power switch 108 according to an implementation. In some examples, the first power switch 106 and the second power switch 108 may be an N-type MOSFETs. Referring to FIG. 2, each of the first power switch 106 and the second power switch 108 includes a gate (G), a source (S), and a drain (D). Also, each of the first power switch 106 and the second power switch 108 includes an intrinsic body diode 131, an anti-diode 133, and a parasitic output capacitor 135.

Referring back to FIG. 1B, the bridge circuit 104 may generate a square wave voltage by alternatively driving the first power switch 106 and the second power switch 108. In some examples, in normal switching mode, the bridge circuit 104 is alternatively driven with a 50% duty cycle for each switch. Based on the voltage-controlled signal ($V_{FCTRL}$), the oscillator 150 generates the first clock signal to control the first driver 152, and the second clock signal to control the second driver 154. The first driver 152 is connected to the gate of the first power switch 106, and the second driver 154 is connected to the gate of the second power switch 108.

In normal switching mode, the first driver 152 and the second driver 154 may switch the first power switch 106 and the second power switch 108, respectively, on and off in phase opposition symmetrically, that is, for exactly the same time (or around the same time). This can be referred to as 50% duty cycle operation even if the conduction time of either power switch 106, 108 is slightly shorter than 50% of the switching period. In other words, the first power switch 106 and the second power switch 108 may operate under the condition of equal pulse width (or substantially equal pulse). In some examples, a dead time (e.g., a small dead time) is inserted between the turn-off of either power switch 106, 108 and the turn-on of the complementary one. This may ensure that the first power switch 106 and the second power switch 108 will not cross-conduct (or substantially not cross-conduct).

Based on the switching of the first power switch 106 and the second power switch 108, the bridge circuit 104 generates a square waveform, which excites the resonant network 105. The resonant network 105 filters the higher harmonic currents of the square waveform generated by the bridge circuit 104. Essentially, only sinusoidal current is allowed to flow through the resonant network 105 even though a square wave voltage is applied to the resonant network 105. As such, the resonant network 105 generates and outputs a resonant sinusoidal waveform that is scaled by the transformer 116 and rectified by the rectification circuit 124, and the output capacitance circuit 125 filters the rectified current and outputs a DC output voltage ($V_o$). The output voltage ($V_o$) may be adjusted by changing the operational frequency of the first power switch 106 and the second power switch 108.

In some examples, the resonant network 105 includes at least three reactive elements. In some examples, the resonant converter 180 is an LLC resonant converter. For example, the resonant network 105 may include a resonant capacitor ($C_r$) 110, a resonant inductor ($L_r$) 112, and a magnetizing inductor ($L_m$) 114. The magnetizing inductor 114 is configured to operate as a shunt inductor. The current may lag the voltage applied to the resonant network 105, which allows the first power switch 106 and the second power switch 108 to be turned on with zero voltage. The transformer 116 includes a primary side winding 120 and one or more secondary side windings such as a first secondary side winding 118 and a second secondary side winding 122. The first secondary side winding 118 and the second secondary side winding 122 are coupled in series. In some examples, the secondary side winding includes only one winding (e.g., either first secondary side winding 118 or second secondary side winding 122). In some examples, the transformer 116 includes multiple windings on the primary side and multiple windings on the secondary side.

The rectification circuit 124 may produce a DC voltage by rectifying AC current. For example, the rectification circuit 124 may rectify the AC current with rectifier diodes such as a first rectification diode 130, and a second rectification diode 132. In some examples, the rectification circuit 124 includes only one rectification diode (e.g., either the first rectification diode 130 or the second rectification diode 132). In some examples, the rectification circuit 124 includes more than two rectification diodes. The anode of the first rectification diode 130 is connected to the positive terminal of the first secondary side winding 118, and the anode of the second rectification diode 132 is connected to the negative terminal of the second secondary side winding 122.

The output capacitance circuit 125 may filter the rectified current and output the DC output voltage ($V_o$). The output capacitance circuit 125 may include an output capacitor ($C_o$) 126, and an output resistor ($R_o$) 128. In some examples, the output capacitor 126 is connected in parallel to the output resistor 128. In some examples, the output capacitance circuit 125 may be a circuit separate from the rectification circuit 124. In some examples, the output capacitance circuit 125 may be part of the rectification circuit 124.

The first rectification diode 130 and the second rectification diode 132 are connected to the output capacitor 126. For example, the cathode of the first rectification diode 130 is connected to the positive terminal of the output capacitor 126, and the cathode of the second rectification diode 132 is also connected to the positive terminal of the output capacitor 126. The negative terminal of the output capacitor 126 is connected to a ground 134.

The feedback circuit 144 may regulate the switching frequency of the resonant converter 180 with a voltage feedback loop by sensing the output voltage. The feedback circuit 144 may be connected to the output capacitance circuit 125 and/or the rectification circuit 124. The isolation circuit 142 is provided on the voltage feedback loop in order to provide isolation required by safety regulations. The isolation circuit 142 may receive a signal from the feedback circuit 144, and then generate the frequency-controlled voltage signal $V_{FCTRL}$ which is supplied to the oscillator 150.

Figure 3:
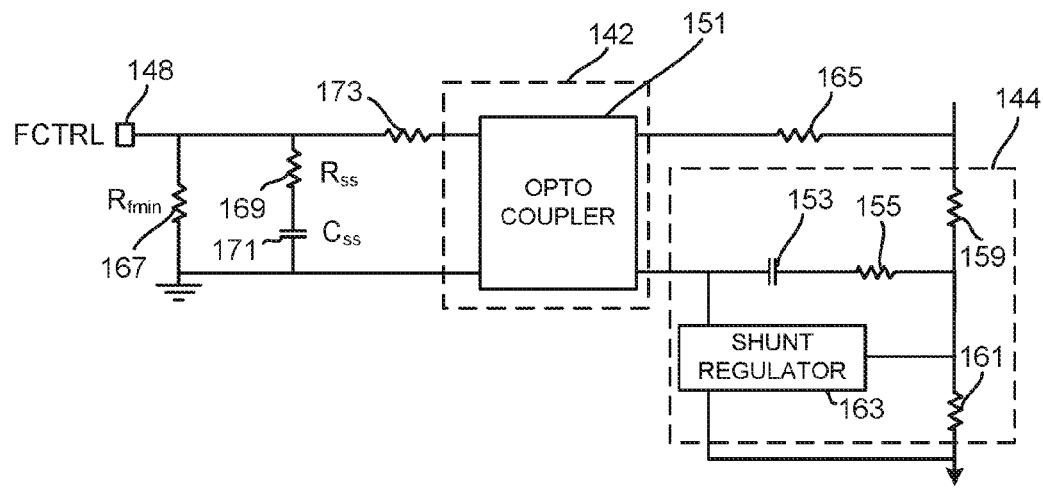
FIG. 3 illustrates an example of a feedback circuit and an isolation circuit of the resonant converter according to an implementation.

FIG. 3 illustrates an example of the feedback circuit 144 and the isolation circuit 142 according to an implementation. In some examples, the feedback circuit 144 includes a shunt regulator 163. In some examples, the feedback circuit 144 includes one or more compensation resistors and one or more compensation capacitors. For example, the feedback circuit 144 may include a capacitor 153, a resistor 155, a resistor 159, and a resistor 161. The isolation circuit 142 may include an opto-coupler 151. The opto-coupler 151 may be coupled to the feedback circuit 144 and the voltage signal access pin 148. Also, in some examples, the resonant converter 180 may include a resistor ($R_{fmin}$) 167, a resistor ($R_{ss}$) 169, a capacitor ($C_{ss}$) 171, a resistor 173, and a resistor 165. The resistor 167 may be coupled to the voltage signal access pin 148, and the resistor 167 may be in parallel with the resistor 169 and the capacitor 171. The resistor 173 may be disposed between the opto-coupler 151 and the voltage signal access pin 148.

Referring back to FIG. 1B, the current $I_{PRI}$ (through the resonant inductor 112) lags the voltage applied to the resonant network 105, which allows the first power switch 106 and the second power switch 108 to be turned on with zero voltage. Referring to FIGS. 1B and 2, the first power switch 106 turns on while the voltage across the first power switch 106 is zero by flowing current through the anti-diode 133 of the first power switch 106. The parasitic output capacitor 135 of the first power switch 106 is discharged before the first power switch 106 is turned on. Similarly, the second power switch 108 turns on while the voltage across the second power switch 108 is zero by flowing current through the anti-diode 133 of second power switch 108. The parasitic output capacitor 135 of the second power switch 108 is discharged before the second power switch 108 is turned on.

Figure 4:
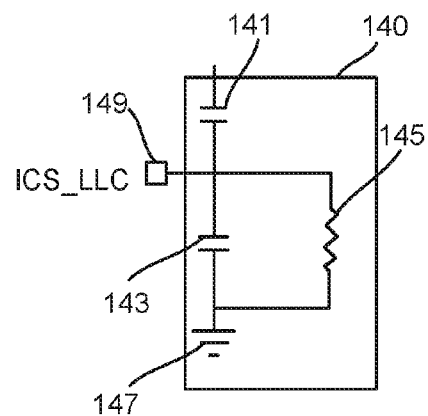
FIG. 4 illustrates an example of an integrated current sense circuit of the resonant converter according to an implementation.

The resonant converter 180 may include an integrated current sense circuit 140. The integrated current sense circuit 140 may be connected to the resonant network 105, and may sense the voltage/current on the primary side of the transformer 116. Also, the integrated current sense circuit 140 may be connected to the integrated current sense voltage access pin 146. FIG. 4 illustrates an example of the integrated current sense circuit 140 according to an implementation. The integrated current sense signal may be the integrated current of the primary side of the transformer 116. In some examples, the integrated current sense circuit 140 senses the integrated current sense signal by a capacitor divider from the voltage of the resonance capacitor 110. The integrated current sense circuit 140 may include a first capacitor 141 and a second capacitor 143. The first capacitor 141 and the second capacitor 143 are configured as a capacitor divider from the voltage of the resonance capacitor 110. The first capacitor 141 may be in series with the second capacitor 143. The integrated current sense circuit 140 may include a resistor 145 in parallel with the second capacitor 143. In some examples, the resonant converter 100 may include an integrated current sense access pin 149 coupled to a point between the first capacitor 141 and the second capacitor, which may receive the integrated current sense signal. In some examples, the integrated current sense access pin 149 and the integrated current sense voltage access pin 146 are the same pin. In some examples, the integrated current sense access pin 149 is a pin different than the integrated current sense voltage access pin 146. The voltage ($V_{ICS}$) of the integrated current sense signal may have a relation with the current ($I_{PRI}$) flowing through the resonance inductor 112. For example, $V_{ICS}$=k*(integral ($I_{PRI}$))– bias voltage. The ratio of the first capacitor 141 and the second capacitor 143 may determine the constant k, and the resistor 145 may remove the voltage offset (or voltage bias) of the voltage of the capacitor divider.

According to the embodiments, as shown in FIG. 1B, the resonant converter 180 includes the burst mode controller 101, and the soft burst circuit 184. The burst mode controller 101 may control the burst mode by determining the start of a burst pulse (e.g., burst mode-in) using a power estimation signal (P_EST), and by determining the end of the burst pulse (e.g., burst mode-out) using a frequency control signal ($V_{IFCTRL}$). The power estimation signal (P_EST) may represent an output load condition of the resonant converter 180. The frequency control signal ($V_{IFCTRL}$) may be a voltage signal corresponding to current $I_{FCTRL}$ for burst operation.

The burst mode controller 101 includes a power estimator 170, a first voltage comparator 172, a latch 174, a current-controlled voltage source 176, a sample hold circuit 181, and a second voltage comparator 182. The power estimator 170 may be coupled to the integrated current sense voltage access pin 146. In some examples, the power estimator 170 may be coupled to the integrated current sense circuit 140. The power estimator 170 may be configured to receive the integrated current sense signal, and generate the power estimation signal (P_EST) based on the integrated current sense signal. The first voltage comparator 172 may include a negative input terminal, a positive input terminal, and an output terminal. The negative input terminal of the first voltage comparator 172 may be coupled to the output of the power estimator 170 (e.g., to receive the power estimation signal (P_EST)). The positive input terminal of the power estimator 170 may be coupled to a Burst$_{IN}$ threshold voltage (e.g., the first voltage threshold). The latch 174 may include a set terminal (S), a reset terminal (R), and an output terminal (Q). The output terminal of the first voltage comparator 172 may be coupled to the set terminal (S) of the latch 174. The reset terminal (R) of the latch 174 may be coupled to an output of the second voltage comparator 182, and the output terminal (Q) of the latch 174 may be coupled to the soft burst circuit 184.

The current-controlled voltage source 176 may be coupled to the voltage signal access pin 148 to sense the frequency control current $I_{FCTRL}$. The current-controlled voltage source 176 may generate the frequency control signal ($V_{IFCTRL}$). The frequency control signal (VIFCTRL) corresponds to $I_{FCTRL}$. The sample hold circuit 181 may be coupled to the current-controlled voltage source 176 to receive the frequency control signal ($V_{IFCTRL}$). The sample hold circuit 181 may be coupled to the output terminal of the first voltage comparator 172. The second voltage comparator 182 includes a positive input terminal, a negative input terminal, and an output terminal. The positive input terminal of the second voltage comparator 182 may be coupled to the output of the sample hold circuit 181, the negative input terminal of the second voltage comparator 182 may be coupled to the current-controlled voltage source 176 to receive the frequency control signal ($V_{IFCTRL}$), and the output terminal of the second voltage comparator 182 may be coupled to the reset terminal (R) of the latch 174.

The power estimator 170 may receive the voltage $V_{ICS}$ and generate the power estimation signal (P_EST) based on the voltage $V_{ICS}$. In some examples, the power estimation signal (P_EST) indirectly represents the output load condition. For example, the integrated current sense signal (sensed from the resonant capacitor 110) includes output current information. Since the output voltage ($V_o$) may be constant and $V_{ICS}$ averages input current, the integrated current sense signal may represent output power. In some examples, the power estimator 170 may generate the power estimation signal (P_EST) by calculating the difference between voltage ($V_{ICS}$) at the falling edge of the gate signal and the voltage ($V_{ICS}$) at the rising edge of the gate signal. In some examples, the burst mode controller 101 may compare the voltage of the power estimation signal with a voltage of a burst enable signal, and, in response to the voltage of the power estimation signal being higher than the voltage of the burst enable signal, the burst mode controller 101 enables the burst control mode.

The first voltage comparator 172 may compare the voltage of the power estimation signal (P_EST) with the Burst$_{IN}$ threshold voltage (e.g., (e.g., the first voltage threshold). In some examples, Burst$_{IN}$ threshold voltage is a voltage within a range of 300 mV to 350 mV. In response to the power estimation signal (P_EST) being lower than Burst$_{IN}$ threshold voltage (and the burst control mode is enabled), the burst mode controller 101 determines the start of the burst pulse, and the switching operation is paused. For example, when the output of the first voltage comparator 172 is a logic high, the output terminal (Q) of the latch 174 is a logic high. The output terminal (Q) of the latch being a logic high indicates that the switching operations are paused. In response to receiving the logic high output from the latch 174, the first driver 152 and the second driver 154 may stop the switching operations.

The current-controlled voltage source 176 may generate the frequency control signal ($V_{IFCTRL}$) using the frequency-controlled voltage controlled signal received from the voltage signal access pin 148. The current-controlled voltage source 176 may gradually decrease the frequency control signal ($V_{IFCTRL}$). The frequency control signal ($V_{IFCTRL}$) may determine the burst mode-out (e.g., the end of the burst pulse of the burst mode). The sample hold circuit 181 samples the frequency control signal ($V_{IFCTRL}$) and outputs the sampled frequency control with an offset introduced by voltage off-setter 183. In some examples, the offset is a voltage in a range of 50 mV to 150 mV. In some examples, the output of the sample hold circuit 181 may be considered the second voltage threshold.

The second voltage comparator 182 may compare the voltage of the frequency control signal ($V_{IFCTRL}$) with the output of the sample hold circuit 181 (e.g., the second voltage threshold). In response to the frequency control signal ($V_{IFCTRL}$) being lower than the output of the sample hold circuit 181, the burst mode controller 101 determines the end of the burst pulse of the burst mode. At the end of the burst pulse, the switching operation is resumed with a soft burst. The soft burst may make the primary current increase gradually (or softly) when the burst mode is terminated. For example, when the frequency control signal ($V_{IFCTRL}$) is lower than the output of the sample hold circuit 181, the output of the second voltage comparator 182 is high, which causes the latch 174 to reset and output low. The low output of the latch 174 indicates the end of the burst pulse of the burst mode, and the switching operation is resumed with the soft burst circuit 184.

The soft burst circuit 184 may receive the low output of the latch 174 (e.g., the burst mode-out) and may control the oscillator 150 to resume switching operations under soft burst mode. In some examples, the soft burst circuit 184 may receive the burst mode-out signal and the first clock signal, and generate a soft burst (SB) control signal based on the burst mode-out signal and the first clock signal, where the SB control signal is sent to the oscillator 105 to determine the first clock signal and the second clock signal under the soft burst mode. For example, the soft burst circuit 184 may generate and send the SB control signal to the oscillator 150 to be used for the generation of the first clock signal and the second clock signal during the resumed switching operations.

In some examples, the SB control signal is a multi-step SB control signal that operates to decrease (step-by-step) the switching frequency of the first power switch 106 and the second power switch 108 during the soft burst mode. In some examples, the SB control signal includes a plurality of voltage steps including a first voltage step associated with a first voltage level, a second voltage step associated with a second voltage level, and a third voltage step associated with a third voltage level. The second voltage level may be less than the first voltage level, and the third voltage level may be less than the second voltage level. Based on the SB control signal, the oscillator 150 may decrease the switching frequency in a step-by-step manner. As a result, the primary side current during the soft burst may be gradually increased.

Figure 5:
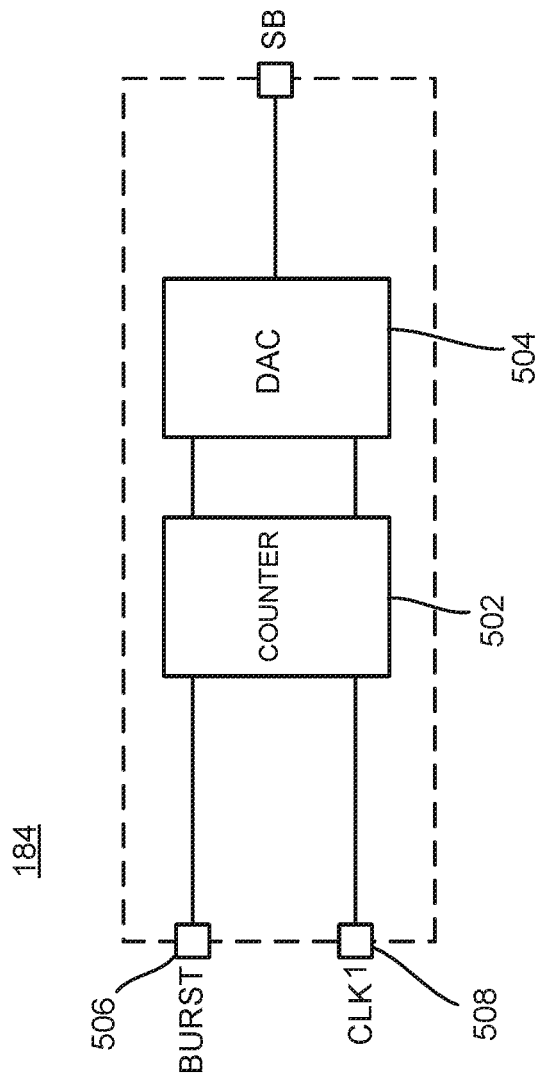
FIG. 5 illustrates an example of a soft burst circuit of the resonant converter according to an implementation.

FIG. 5 illustrates an example of the soft burst circuit 184 according to an implementation. Referring to FIG. 5, the soft burst circuit 184 includes a down counter 502 and a digital-analog converter 504 to generate a multi-step voltage SB control signal. In some examples, the soft burst circuit 184 is connected to a burst access pin 506 to receive the burst mode-out signal. In some examples, the soft burst circuit 184 is connected to a first clock signal access pin 508 to receive the first clock signal. In some examples, the down counter 502 is a 3-bit down counter. In some examples, the down counter 503 is a 4-bit down counter. The down counter 502 receives the first clock signal, and the output of the down counter 502 is converted to an analog voltage by the digital-analog converter 504, where the analog voltage may have two or more steps. The voltage steps of the multi-step SB control is used by the oscillator 150 to control the switching operations under the soft burst mode. In some examples, when the voltage of the multi-step SB control signal is below a threshold level, the burst mode controller 101 is configured to end the soft burst mode. At the end of the soft burst mode, the oscillator 150 switches the first power switch 106 and the second power switch 108 according to normal switching conditions until the detection of a subsequent burst pulse.

Figure 6:
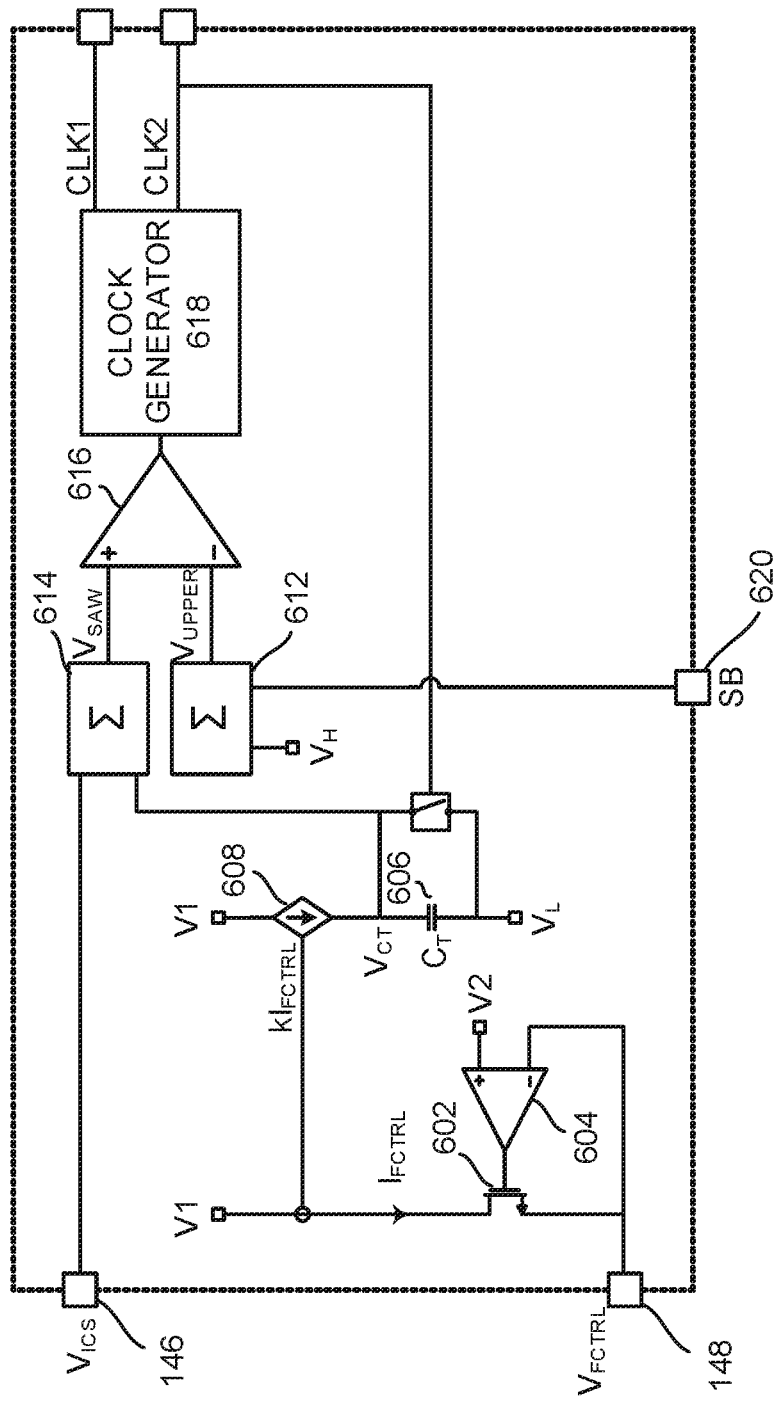
FIG. 6 illustrates an example of an oscillator of the resonant converter according to an implementation.

FIG. 6 illustrates an example of the oscillator 150 according to an implementation. The oscillator 150 may receive the integrated current sense voltage $V_{ICS}$ from the integrated current sense voltage access pin 146, the voltage-controlled signal $V_{FCTRL}$ from the voltage signal access pin 148, and the SB control signal from an SB access pin 620 (or the soft burst circuit 184), and generate the first clock signal CLK1 and the second clock signal CLK1 for driving the first power switch 106 and the second power switch 108 when the switching operation is resumed under the soft burst. The oscillator 150 may generate the frequency control current $I_{FCTRL}$ to maintain $V_{FCTRL}$ by V2. The oscillator 150 may include a transistor 602, a voltage comparator 604 (comparing $V_{FCTRL}$ with $V_2$), a current controlled current source 608 that generates current $kI_{FCTRL}$ which is proportional to $I_{FCTRL}$, a timing capacitor ($C_T$) 606, a first series voltage summer 614 (summing $V_{CT}$ with $V_{ICS}$ to produce $V_{SAW}$), a second series voltage summer 612 (subtracting $V_{SB}$ from $V_H$ to produce $V_{UPPER}$), a voltage comparator 616 (comparing $V_{SAW}$ with $V_H$), and a clock generator 618.

The current $kI_{FCTRL}$ charges the timing capacitor $C_T$ 606. The first series voltage summer 614 adds the capacitor voltage $C_{CT}$ to the integrated current sense voltage $V_{ICS}$ to generate the $V_{SAW}$, and the second series voltage summer 612 subtracts the SB control signal from the voltage $V_H$ to generate the voltage $V_{UPPER}$. Under normal conditions, the clock generator 618 determines the first clock signal CLK1 from $V_{SAW}=V_L=1V$ to $V_H=3V$, and the second clock signal CLK2 is the same with the first clock signal CLK1 such that the switching frequency is determined by 1/(CLK1+CLK2). In soft burst, the clock generator 618 determines the first clock signal from $V_{saw}=V_L=1V$ to ($V_H=3V$ minus the SB control signal), where the SB control signal may have a range from 0-2V (which decreases by the down counter 502). The first clock signal in soft burst mode may be shorter than the first clock signal in the normal mode, and induces a higher frequency as compared with the frequency of the normal mode. However, since the SB control signal is decreased by the down counter 502, the frequency during the soft burst mode moves from a first frequency (e.g., a relatively high frequency) to a second frequency (e.g., a relatively how frequency).

Figure 7:
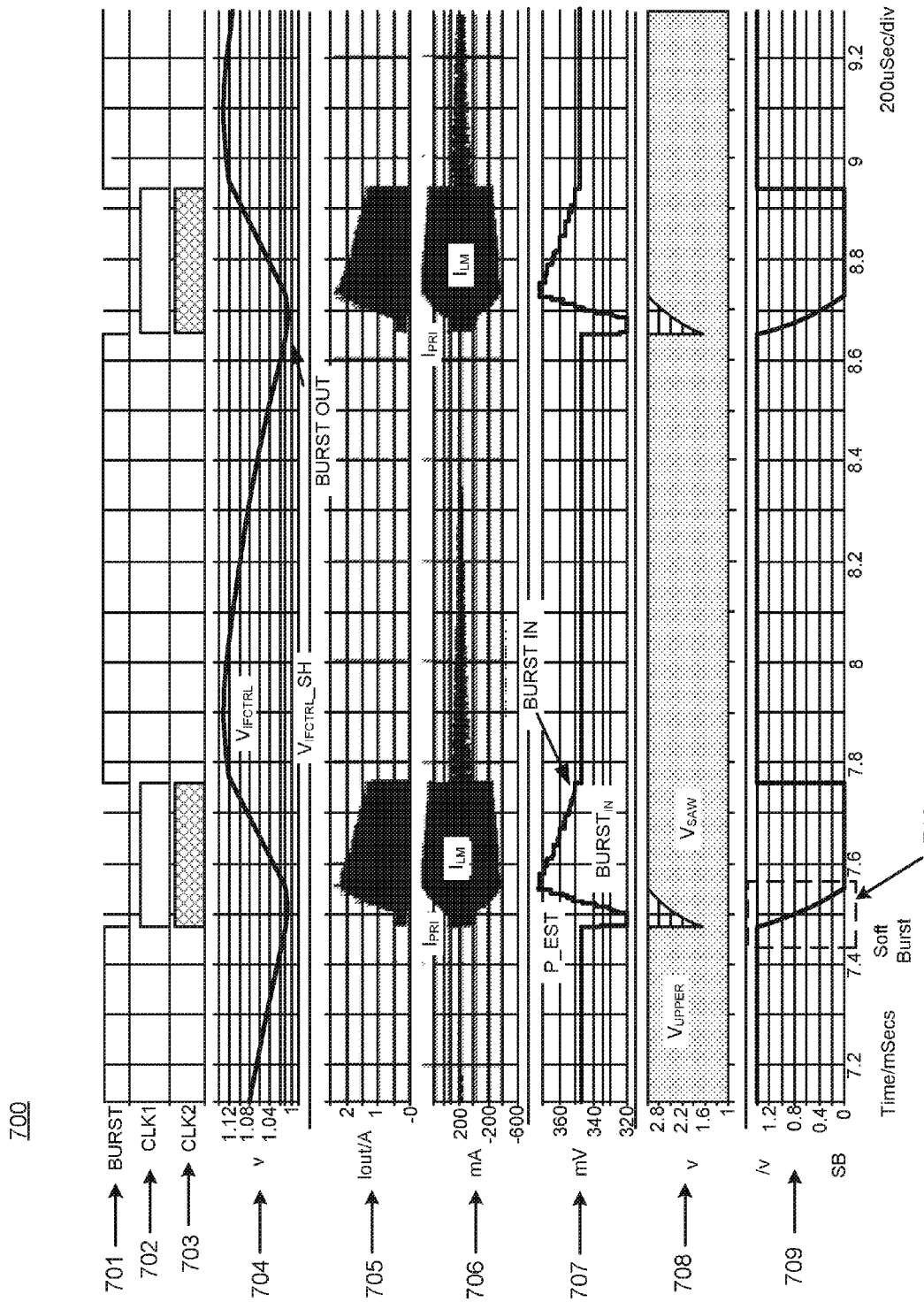
FIG. 7 illustrates example simulation results of burst mode control using soft burst to resume switching operations according to an implementation.

FIG. 7 illustrates example simulation results 700 of burst mode control using soft burst to resume switching operations according to an implementation. For example, the simulation results 700 provide various waveforms of signals during the burst mode control of the resonant converter 180. The simulation results 700 depict a burst mode control signal 701 having a burst pulse (high signal) that begins at burst in and ends at burst out, a first clock signal 702, a second clock signal 703, a frequency control signal ($V_{IFCTRL}$) 704, an output current signal 705, a current $I_{PRI}$ signal 706 (through the resonant inductor 112), a power estimation signal 707, a voltage timing signal 708 depicting $V_{UPPER}$ and $V_{SAW}$, and a SB control signal 709.

As shown in FIG. 7, when the power estimation signal 707 is below the first voltage threshold (e.g., $BURST_{IN}$), the burst mode controller 101 determines a start of the burst pulse (BURST IN) of the burst mode control signal 701, and the switching operations of the first power switch 106 and the second power switch 108 are paused, which can reduce the current through the magnetizing inductor 114. When the frequency control signal ($V_{IFCTRL}$) 704 is below the second voltage threshold (e.g., $V_{IFCFR\_SH}$=output of sample hold circuit 181), the burst mode controller 101 determines an end of the burst pulse (BURST OUT) of the burst mode control signal 701, and the switching operations are resumed with the soft burst circuit 184 at location 710 in the SB control signal 709.

According to an implementation, a resonant converter for burst mode control includes an oscillator configured to control switching operations of at least one power switch, and a burst mode controller configured to control a burst mode by determining a start of a burst pulse of the burst mode using a first internal signal and determining an end of the burst pulse of the burst mode using a second internal signal. The burst mode controller is configured to stop the switching operations during the burst pulse.

According to some implementations, the resonant converter may include one or more of the following features (or any combination thereof). The first internal signal may represent an output load condition of the resonant converter. The first internal signal may include a power estimation signal. The second internal signal may include a frequency control signal. The burst mode controller may be configured to determine the start of the burst pulse in response to a voltage of the first internal signal being less than a voltage threshold. The burst mode controller may be configured to determine the end of the burst pulse in response to a voltage of the second internal signal being less than a voltage threshold. The resonant converter may include a soft burst circuit configured to control the oscillator in a soft burst mode in response to the end of the burst pulse. The oscillator, when in the soft burst mode, is configured to resume switching operations of the at least one power switch. The oscillator, when in the soft burst mode, may be configured to switch the at least one power switch at a first frequency for a first duration, and switch the at least one power switch at a second frequency for a second duration after the first duration, where the second frequency is lower than the first frequency.

According to an implementation, a resonant converter for burst mode control includes an oscillator configured to control switching operations of at least one power switch, and a burst mode controller configured to control a burst mode by determining a start of a burst pulse of the burst mode in response to a voltage of a power estimation signal being less than a first voltage threshold, and determining an end of the burst pulse of the burst mode in response to a voltage of a frequency control signal being less than a second voltage threshold. The burst mode controller is configured to stop the switching operations during the burst pulse.

According to some implementations, the resonant converter may include one or more of the above/below features (or any combination thereof). The burst mode controller may include a power estimator configured to generate the power estimation signal based on an integrated current sense signal sensed on a primary side of a transformer of the resonant converter. The burst mode controller may include a first voltage comparator configured to compare the voltage of the power estimation signal with the first voltage threshold, and a second voltage comparator configured to compare the voltage of the frequency control signal with the second voltage threshold. The resonant converter may include a soft burst circuit configured to control the oscillator in a soft burst mode by sending a soft burst control signal to the oscillator in response to the end of the burst pulse. The oscillator, when in the soft burst mode, is configured to resume switching operations of the at least one power switch based on the soft burst control signal. The soft burst control signal may include a first voltage step and a second voltage step, where a voltage of the second voltage step is less than a voltage of the first voltage step. The oscillator, when in the soft burst mode, is configured to switch the at least one power switch at a first frequency based on the first voltage step, and decrease the first frequency to a second frequency based on the second voltage step.

According to an implementation, a resonant converter for burst mode control includes an oscillator configured to control switching operations of at least one power switch, a burst mode controller configured to control a burst mode by determining a start of a burst pulse of the burst mode and determining an end of the burst pulse of the burst mode. The burst mode controller is configured to stop the switching operations during the burst pulse. The resonant converter includes a soft burst circuit configured to control the oscillator in a soft burst mode. The soft burst circuit is configured to send a soft burst control signal to the oscillator in response to the end of the burst pulse, and the oscillator is configured to resume switching operations of the at least one power switch in response to the soft burst control signal.

According to some implementations, the resonant converter may include one or more of the above/below features (or any combination thereof). The start of the burst pulse of the burst mode may be determined using a power estimation signal. The end of the burst pulse of the burst mode may be determined using a frequency control signal. The burst mode controller may be configured to determine the start of the burst pulse in response to a voltage of a first internal signal being less than a voltage threshold. The burst mode controller may be configured to determine the end of the burst pulse in response to a voltage of a second internal signal being less than a voltage threshold. The burst mode controller may include a power estimator configured to generate the power estimation signal based on an integrated current sense signal sensed on a resonant network of the resonant converter, a first voltage comparator configured to compare a voltage of the power estimation signal with a first voltage threshold, where the start of the burst pulse is determined in response to the voltage of the power estimation signal being less than the first voltage threshold, and a second voltage comparator configured to compare a voltage of the frequency control signal with a second voltage threshold, where the end of the burst pulse is determined in response to the voltage of the frequency control signal being less than the second voltage threshold. The soft burst control signal may include a multi-step voltage signal. The oscillator may be configured to decrease a frequency of the switching operations during the soft burst mode according to the multi-step voltage signal.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A resonant converter for burst mode control, the resonant converter comprising:
   an oscillator configured to control switching operations of at least one power switch; and
   a burst mode controller configured to control a burst mode by determining a start of a burst pulse of the burst mode using a first internal signal and determining an end of the burst pulse of the burst mode using a second internal signal, the burst mode controller configured to stop the switching operations during the burst pulse,
   the burst mode controller configured to compare a voltage of the first internal signal with a first voltage threshold to determine the start of the burst pulse, and to compare a voltage of the second internal signal with a second voltage threshold to determine the end of the burst pulse.

2. The resonant converter of claim 1, wherein the first internal signal represents an output load condition of the resonant converter.

3. The resonant converter of claim 1, wherein the first internal signal includes a power estimation signal.

4. The resonant converter of claim 1, wherein the second internal signal includes a frequency control signal.

5. The resonant converter of claim 1, wherein the burst mode controller is configured to determine the start of the burst pulse in response to the voltage of the first internal signal being less than the first voltage threshold.

6. The resonant converter of claim 1, wherein the burst mode controller is configured to determine the end of the burst pulse in response to the voltage of the second internal signal being less than the second voltage threshold.

7. The resonant converter of claim 1, further comprising:
   a soft burst circuit configured to control the oscillator in a soft burst mode in response to the end of the burst pulse, the oscillator, when in the soft burst mode, configured to resume switching operations of the at least one power switch.

8. The resonant converter of claim 7, wherein the oscillator, when in the soft burst mode, is configured to switch the at least one power switch at a first frequency for a first duration, and switch the at least one power switch at a second frequency for a second duration after the first duration, the second frequency being lower than the first frequency.

9. The resonant converter of claim 1, wherein the burst mode controller includes a first voltage comparator to compare the voltage of the first internal signal with the first voltage threshold, and a second voltage comparator to compare the voltage of the second internal signal with the second voltage threshold.

10. A resonant converter for burst mode control, the resonant converter comprising:
    an oscillator configured to control switching operations of at least one power switch; and
    a burst mode controller configured to control a burst mode by determining a start of a burst pulse of the burst mode in response to a voltage of a power estimation signal being less than a first voltage threshold, and determining an end of the burst pulse of the burst mode in response to a voltage of a frequency control signal being less than a second voltage threshold, the burst mode controller configured to stop the switching operations during the burst pulse,
    the burst mode controller including a first voltage comparator configured to compare the voltage of the power estimation signal with the first voltage threshold, and a second voltage comparator configured to compare the voltage of the frequency control signal with the second voltage threshold.

11. The resonant converter of claim 10, wherein the burst mode controller includes:
    a power estimator configured to generate the power estimation signal based on an integrated current sense signal sensed on a primary side of a transformer of the resonant converter.

12. The resonant converter of claim 10, further comprising:
    a soft burst circuit configured to control the oscillator in a soft burst mode by sending a soft burst control signal to the oscillator in response to the end of the burst pulse, the oscillator, when in the soft burst mode, configured to resume switching operations of the at least one power switch based on the soft burst control signal.

13. The resonant converter of claim 12, wherein the soft burst control signal includes a first voltage step and a second voltage step, a voltage of the second voltage step being less than a voltage of the first voltage step, wherein the oscillator, when in the soft burst mode, is configured to switch the at least one power switch at a first frequency based on the first voltage step, and decrease the first frequency to a second frequency based on the second voltage step.

14. A resonant converter for burst mode control, the resonant converter comprising:
    an oscillator configured to control switching operations of at least one power switch;
    a burst mode controller configured to control a burst mode by determining a start of a burst pulse of the burst mode and determining an end of the burst pulse of the burst mode, the burst mode controller configured to stop the switching operations during the burst pulse; and
    a soft burst circuit configured to control the oscillator in a soft burst mode, the soft burst circuit configured to send a soft burst control signal to the oscillator in response to the end of the burst pulse, the oscillator configured to resume switching operations of the at least one power switch in response to the soft burst control signal, the soft burst circuit including a down counter configured to generate the soft burst control signal as a voltage signal with a first voltage step and a second voltage step, the second voltage step being less than the first voltage step,
    the oscillator configured to switch the at least one power switch at a first frequency in response to the first voltage step,
    the oscillator configured to switch the at least one power switch at a second frequency in response to the second voltage step, the second frequency being less than the first frequency.

15. The resonant converter of claim 14, wherein the start of the burst pulse of the burst mode is determined using a power estimation signal.

16. The resonant converter of claim 14, wherein the end of the burst pulse of the burst mode is determined using a frequency control signal.

17. The resonant converter of claim 14, wherein the burst mode controller is configured to determine the start of the burst pulse in response to a voltage of a first internal signal being less than a voltage threshold.

18. The resonant converter of claim 14, wherein the burst mode controller is configured to determine the end of the burst pulse in response to a voltage of a second internal signal being less than a voltage threshold.

19. The resonant converter of claim 14, wherein the start of the burst pulse of the burst mode is determined using a power estimation signal, and the end of the burst pulse of the burst mode is determined using a frequency control signal, the burst mode controller including:
   a power estimator configured to generate the power estimation signal based on an integrated current sense signal sensed on a resonant network of the resonant converter;
   a first voltage comparator configured to compare a voltage of the power estimation signal with a first voltage threshold, the start of the burst pulse being determined in response to the voltage of the power estimation signal being less than the first voltage threshold; and
   a second voltage comparator configured to compare a voltage of the frequency control signal with a second voltage threshold, the end of the burst pulse being determined in response to the voltage of the frequency control signal being less than the second voltage threshold.

20. The resonant converter of claim 14, wherein the burst mode controller includes a first voltage comparator configured to compare a voltage of a first internal signal with a first voltage threshold to determine the start of the burst pulse, and a second voltage comparator configured to compare a voltage of a second internal signal with a second voltage threshold to determine the end of the burst pulse.

* * * * *